United States Patent [19]
Miyamoto et al.

[11] Patent Number: 5,504,765
[45] Date of Patent: Apr. 2, 1996

[54] LOW-TEMPERATURE RAMAN LASER APPARATUS

[75] Inventors: Yasuaki Miyamoto; Masayoshi Hagiwara; Makoto Hasegawa, all of Tokai, Japan

[73] Assignee: Doryokuro Kakunenryo Kaihatsu Jigyodan, Tokyo, Japan

[21] Appl. No.: 353,993

[22] Filed: Dec. 6, 1994

Related U.S. Application Data

[63] Continuation of Ser. No. 69,578, Jun. 1, 1993, abandoned.

[30] Foreign Application Priority Data

Jun. 5, 1992 [JP] Japan ................................. 4-145342

[51] Int. Cl.$^6$ ........................... H01S 3/30; H01S 3/04
[52] U.S. Cl. ................................ 372/35; 372/3
[58] Field of Search ...................... 372/3, 34, 35; 359/334

[56] References Cited

U.S. PATENT DOCUMENTS

| | | | |
|---|---|---|---|
| 4,194,170 | 3/1980 | Kurnit | 372/3 |
| 5,012,481 | 4/1991 | Casteleiro | 372/35 |

FOREIGN PATENT DOCUMENTS

| | | | |
|---|---|---|---|
| 4157786 | 5/1992 | Japan | 372/3 |

OTHER PUBLICATIONS

Trutna et al., "Multipass Raman Gain Cell" Applied Optics vol. 19, No. 2 pp. 301–312 (Jan 15, 1980).

Primary Examiner—Rodney B. Bovernick
Assistant Examiner—Robert McNutt
Attorney, Agent, or Firm—Armstrong, Westerman, Hattori, McLeland & Naughton

[57] ABSTRACT

A low-temperature Raman laser apparatus that avoids an increase in the pump light power, which would otherwise be needed under room temperature conditions, and eliminates the problems of instability of the equipment and complicatedness of the operation under liquid nitrogen cooling conditions and also lowers the cost, which has heretofore been high due to the consumption of liquid nitrogen, and that is capable of stably and efficiently effecting Raman conversion. The low-temperature Raman laser apparatus has a Raman cell (1) filled with a Raman conversion medium to convert the wavelength of incident pump light by the Raman conversion action of the Raman conversion medium. A heat absorbing member (2) or (3), through which a brine cooled by a brine refrigerator (4) circulates, is provided around the Raman cell (1) to cool the Raman conversion medium to a temperature in the range of from 200° K. to 300° K.

1 Claim, 4 Drawing Sheets

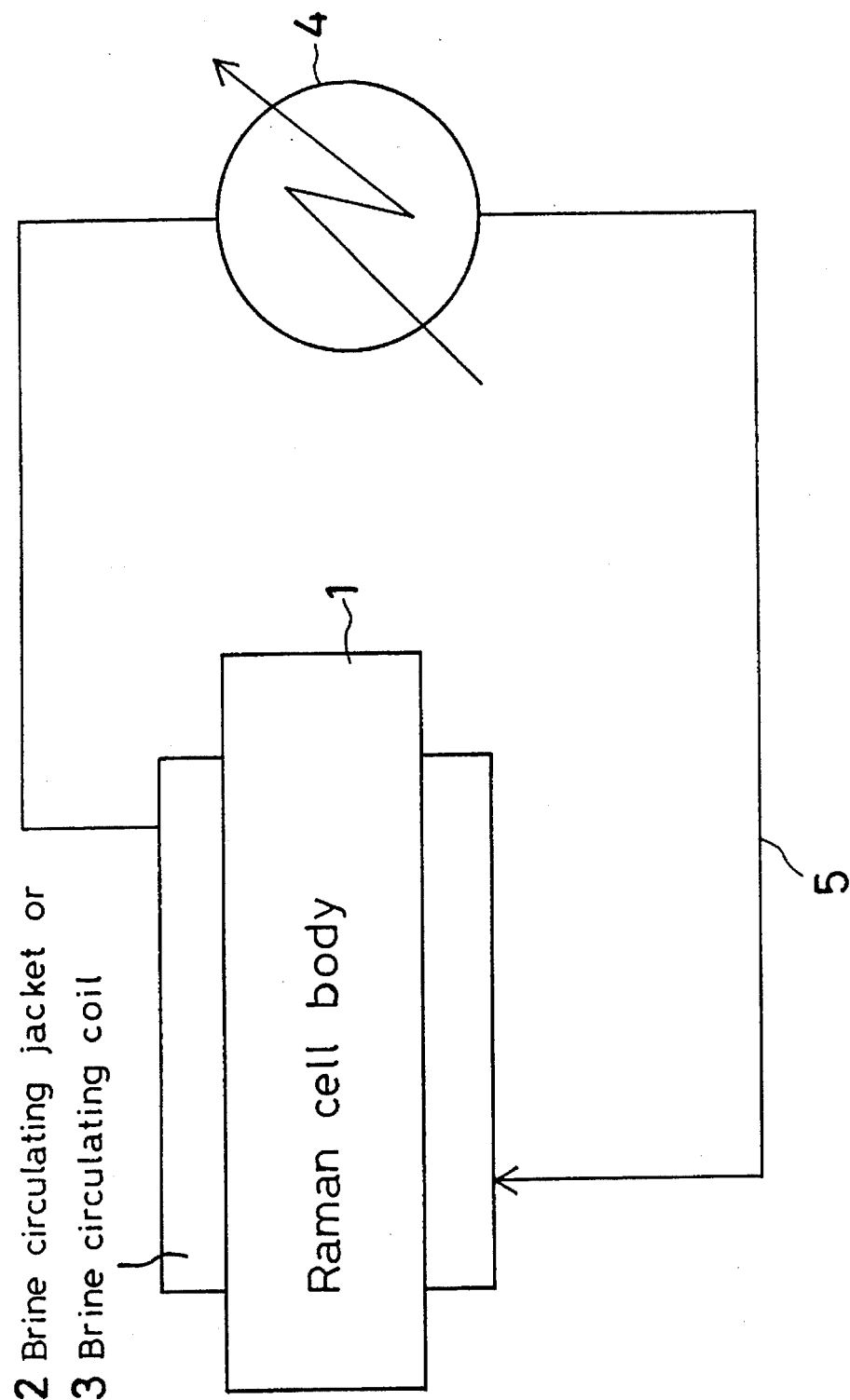

LOW-TEMPERATURE RAMAN LASER APPARATUS

This application is a continuation of application Ser. No. 08/069,578 filed Jun. 1, 1993, now abandoned.

BACKGROUND OF THE INVENTION

The present invention relates to a Raman laser apparatus that converts the wavelength of incident laser light. More particularly, the present invention relates to a low-temperature Raman laser apparatus which employs a simple cooling system and enables Raman conversion to be stably and efficiently effected at reduced cost by an easy operation.

Parahydrogen can take only an even rotational quantum number. It is a known technique as a parahydrogen Raman laser apparatus to convert incident light of frequency $v_p$ into light of frequency $v_p \pm v_R$ by Raman conversion using the energy difference between the rotational levels J=0 and J=2 of parahydrogen (where $v_R$ is Stokes shift of parahydrogen; it is approximately 300 $cm^{-1}$ to 400 $cm^{-1}$). When carbon dioxide laser light is used as incident light, the wavelength of light frequency-converted by such a parahydrogen Raman laser apparatus is about 16 μm, which is coincident with the absorption wavelength of uranium fluoride. Therefore, the laser system can be used as an infrared laser apparatus for molecular laser uranium enrichment. Further, the wavelength of the light frequency-converted by the parahydrogen Raman laser apparatus is also coincident with the absorption wavelengths of fluorides of other heavy metals. Accordingly, the laser system can also be used as an infrared laser for isotope separation of a heavy metal.

Incidentally, in the conventional parahydrogen Raman laser apparatus, parahydrogen gas, which is used as a medium, has heretofore been cooled by either of the following two methods: one in which parahydrogen gas is cooled to about 100° K. by using liquid nitrogen (Appl. Opt. 19(1980)301; Appl. Phys. 57(1985)1504), and the other in which the medium is cooled to about 300° K. under room temperature conditions (Appl. Phys. Lett. 47(1985)1033).

These conventional methods suffer, however, from the following problems. If the Raman laser medium is cooled by using liquid nitrogen, the plane wave Raman gain coefficient increases, which is effective for Raman conversion. However, the temperature conditions are severe upon the equipment. Accordingly, the mirror curvature radius and the distance between the mirrors change to a large extent, and a local change in the density of the medium causes a change in the optical path. In addition, since the difference between the medium temperature and the room temperature is large, the effect of heat externally applied to the cell on the temperature of the medium in the cell is large. In consequence of these, Raman conversion becomes unstable. Further, since liquid nitrogen is consumed at a high rate, the running cost is high. In the case of lowering the medium temperature under room temperature conditions, Raman conversion takes place stably. However, since the plane wave Raman gain coefficient is small, it is necessary to increase pump light power and also increase the propagation distance of light in the medium. As a result, damage to the optical parts is invited, and it is difficult to achieve a high conversion efficiency.

SUMMARY OF THE INVENTION

In view of the above-described circumstances, it is an object of the present invention to provide a low-temperature Raman laser apparatus that eliminates the above-described problems of the prior art, that is, avoids an increase in the pump light power, which would otherwise be needed under the room temperature conditions, and eliminates the problems of instability of the equipment and complicatedness of the operation under the liquid nitrogen cooling conditions and also lowers the cost, which has heretofore been high due to the consumption of liquid nitrogen, and that is capable of stably and efficiently effecting Raman conversion.

To attain the above-described object, the present invention provides a low-temperature Raman laser apparatus having a Raman cell filled with a Raman conversion medium to convert the wavelength of incident pump light by the Raman conversion action of the Raman conversion medium. The low-temperature Raman laser apparatus includes a heat absorbing member through which a brine cooled by a brine refrigerator circulates. The heat absorbing member is provided around the Raman cell to cool the Raman conversion medium to a temperature in the range of from 200° K. to 300° K.

Parahydrogen is one example of the Raman conversion medium used in the present invention.

In the present invention, a heat absorbing member, through which a brine cooled by a brine refrigerator circulates, is provided around the Raman cell to cool the Raman conversion medium to a temperature in the range of from 200° K. to 300° K. Therefore, there is no need for liquid nitrogen, which has heretofore been consumed at 30 kg/h, for example, under the liquid nitrogen cooling conditions. Accordingly, the running cost consists only of the cost of electric power for cooling the brine. Thus, the running cost can be lowered. In addition, since no liquid nitrogen is used, it becomes unnecessary to conduct an operation of charging liquid nitrogen. Further, constituent elements, e.g., the Raman cell body, mirrors, etc., suffer minimal thermal distortion and hence have substantially the same mechanical stability as that under the room temperature conditions. Therefore, the system running operation is simplified, and the Raman conversion can be stably effected. In the case of a parahydrogen Raman laser apparatus, for example, the plane wave Raman gain coefficient can be increased to about 1.5 times that under the room temperature conditions. Accordingly, the threshold value of pump light power needed to cause saturated Raman conversion can be lowered to about 70% of that in the prior art.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a block diagram schematically showing the basic arrangement of a parahydrogen Raman laser apparatus according to the present invention.

DESCRIPTION OF THE PREFERRED EMBODIMENTS

The basis principle of the present invention is that a brine (i.e., an intermediate substance that performs indirect cooling action; secondary refrigerant, e.g., calcium chloride, sodium chloride, ethylene glycol, ethanol, methanol, trichloroethylene, a fluorine-containing solvent, etc.) that is cooled by a brine refrigerator is circulated around a Raman cell filled with a Raman conversion medium, which constitutes the body of a Raman laser apparatus, thereby cooling the Raman conversion medium to a temperature in the range of from 200° K. to 300° K. With this arrangement, an increase in the pump light power is avoided, and the problems of instability of the equipment and complicatedness of the operation in the prior art are solved. In addition, the cost is lowered, and the Raman conversion can be stably and efficiently effected.

Figure 2A:
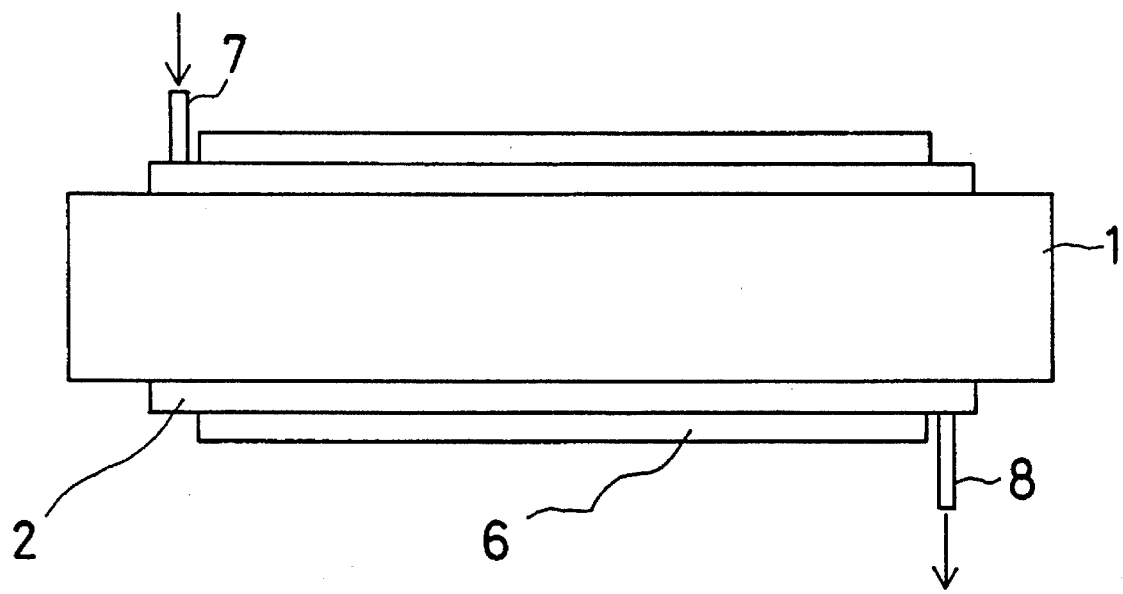
FIGS. 2(a) and (b) shows in more detail the arrangement of a brine circulating jacket and that of a brine circulating coil.
Figure 2B:
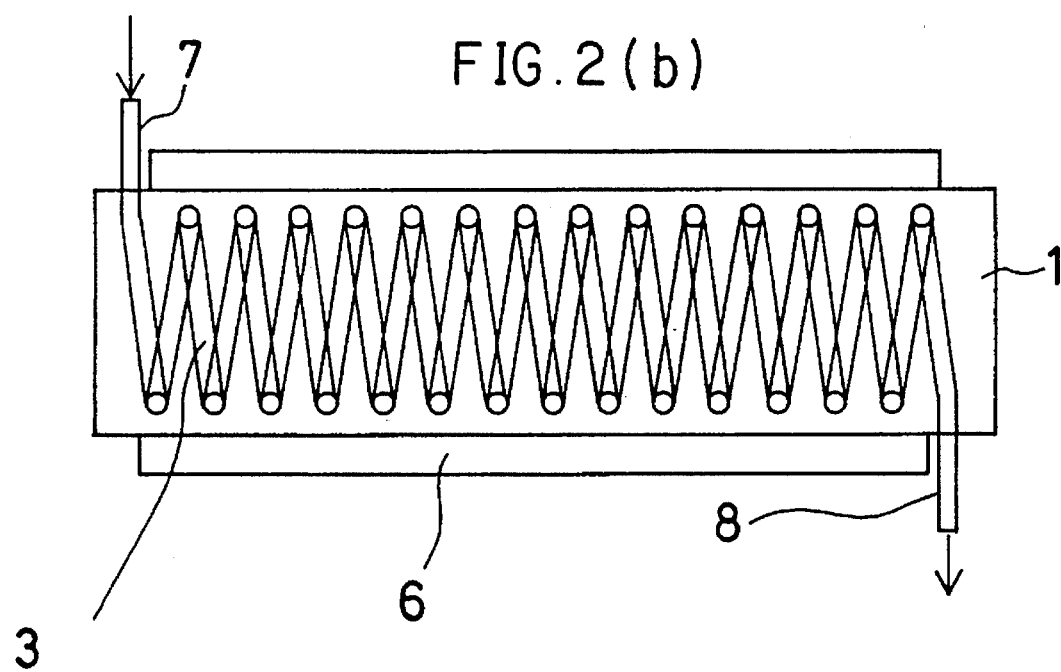

The present invention will be described below more specifically with reference to the accompanying drawings by way of an example in which the present invention is applied to a parahydrogen Raman laser apparatus. FIG. 1 shows schematically the basic arrangement of the parahydrogen Raman laser apparatus. Around a Raman cell body 1, a brine circulating jacket 2 or a brine circulating coil 3 is installed as a heat absorbing member. The jacket 2 or the coil 3 is supplied with a brine which is cooled by a brine refrigerator 4 and circulated through brine supply piping 5, thereby cooling hydrogen gas, as a Raman conversion medium, filling the Raman cell body 1 to a temperature in the range of from 200° K. to 300° K. and thus allowing it to perform Raman conversion under these cooling conditions. FIG. 2 shows in more detail the arrangement of the brine circulating jacket 2 and that of the brine circulating coil 3. FIG. 2(a) shows an arrangement in which the brine circulating jacket 2 is used as a heat absorbing member. The brine circulating jacket 2 is attached around the Raman cell body 1, and a vacuum heat-insulating jacket 6 is wound around the brine circulating jacket 2, thereby effecting heat insulation. The cooling brine is supplied to the brine circulating jacket 2 from a brine inlet 7 and returned to the refrigerator 4 through an brine outlet 8. FIG. 2(b) shows an arrangement in which the brine circulating coil 3 is used as a heat absorbing member. The brine circulating coil 3 is wound around the Raman cell body 1, and the vacuum heat-insulating jacket 6 is wound around the outer periphery of the brine circulating coil 3. As to the arrangement of the brine refrigerator and that of the brine circulating line, any of various known arrangements may be adopted. Examples of the method of controlling the cooling temperature include the following methods: (1) the cooling capacity of the refrigerator is controlled by using, for example, an inverter power supply; (2) a heater is installed in the brine circulating line to control the cooling temperature by means of heating; and (3) a multistage refrigerator is employed, and the cooling temperature is controlled by changing the number of refrigerating machines actually used for the cooling operation.

Incidentally, the plane wave Raman gain coefficient G in rotational Raman scattering is expressed by $$G = \{4\lambda_S^2 \Delta N/(n_S^2 h \omega_S \Delta v_R)\}(d\sigma/d\Omega)$$

$$d\sigma/d\Omega = [\omega_S^4 (J+1)(J+2)/\{5c^4(2J+1)(2J+3)\}]\gamma_{00}^2$$

where $\lambda_S$ is Stokes light wavelength, $\omega_S$ Stokes light frequency, $\Delta v_R$ Raman line width, $\Delta N$ molecular number density difference, $n_S$ medium refractive index by Stokes light wavelength, $d\sigma/d\Omega$ differential Raman scattering sectional area, J rotational level, and $\gamma_{00}$ anisotropic molecular polarizability.

Here, $\Delta N$ and $\Delta v_R$ are parameters which are determined by the temperature and pressure of the medium. Assuming that when the medium pressure is 800 Torr, $\Delta N/\Delta v_R$ is 1 at 100° K., it is about 0.6 at 200° K. and about 0.4 at 300° K. In other words, by lowering the medium temperature from 300° K. to 200° K., the plane wave Raman gain coefficient G increases by about 1.5 times.

Figure 3:
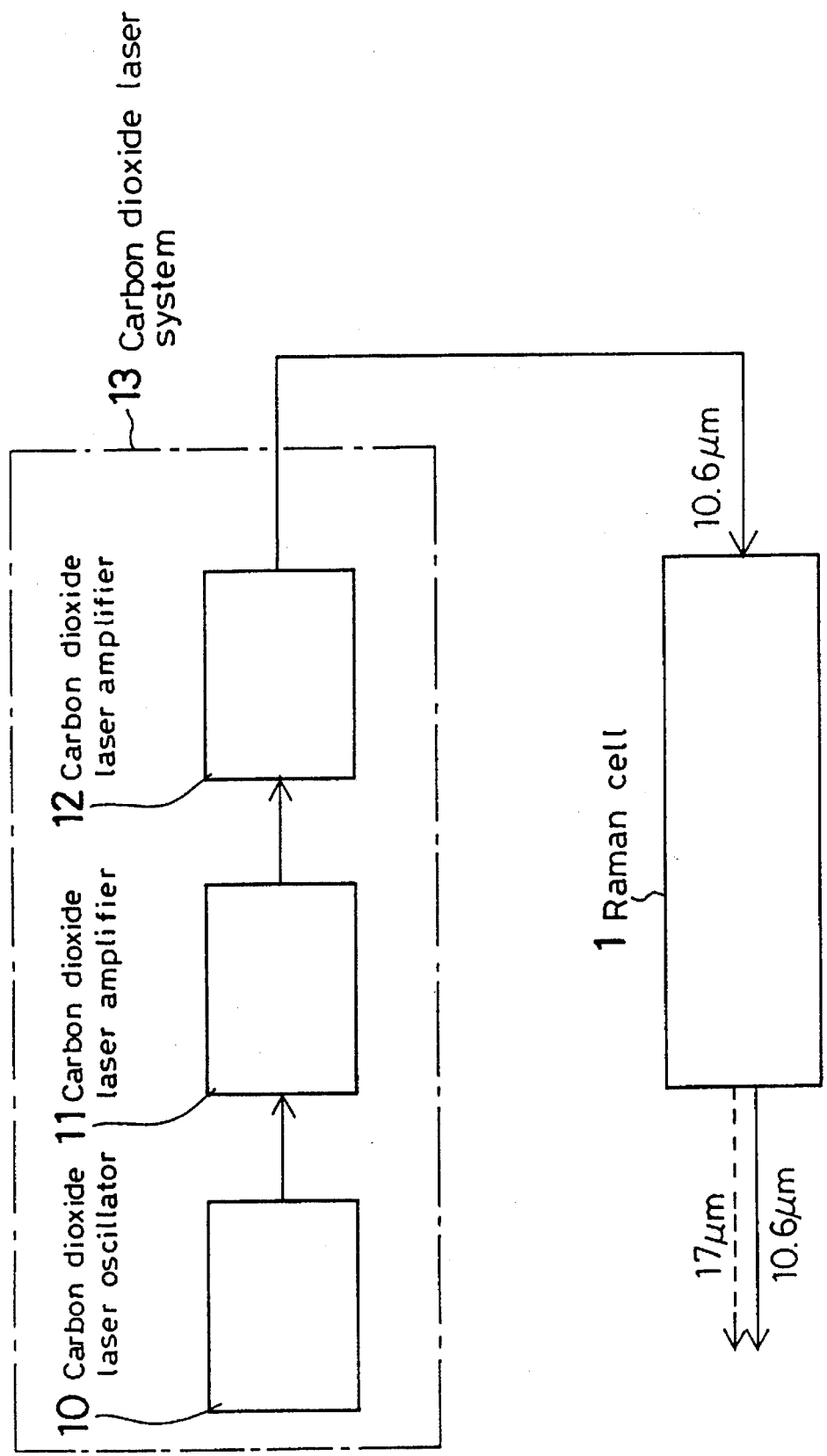
FIG. 3 is a block diagram showing one example of the general arrangement of an apparatus in which light from a carbon dioxide laser system is made incident on the Raman cell shown in FIG. 1 to effect Raman conversion.
Figure 4:
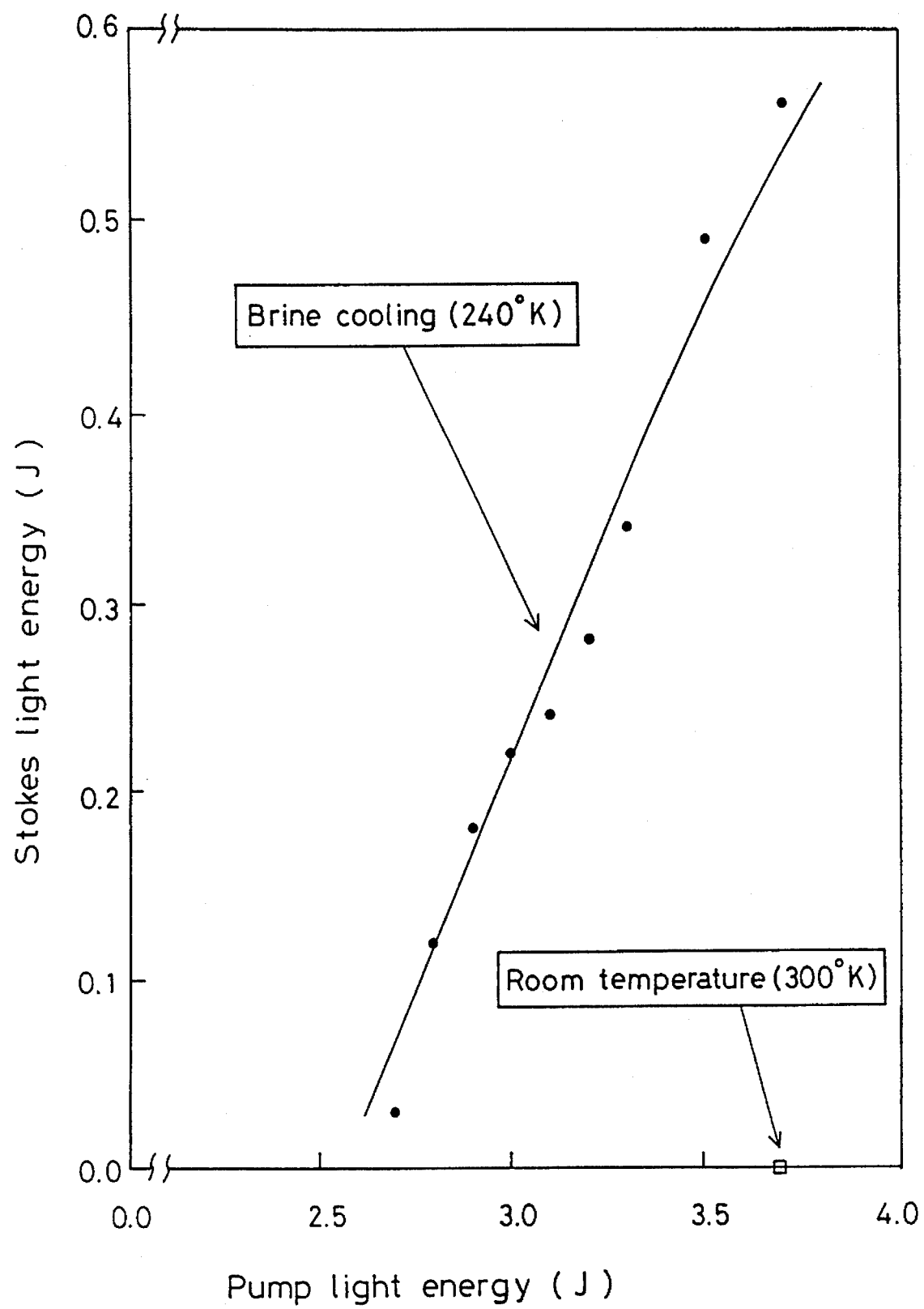
FIG. 4 is a graph showing input-output energy characteristics of the apparatus shown in FIG. 3.

FIG. 3 shows one example of the general arrangement of an apparatus in which laser light of wavelength about 10.6 μm that is oscillated from a carbon dioxide laser system 13, which comprises a carbon dioxide laser oscillator 10 and carbon dioxide laser amplifiers 11 and 12, is made incident on the Raman cell 1, shown in FIG. 1, to effect Raman conversion. Laser light of wavelength about 10.6 μm that is oscillated from the carbon dioxide laser oscillator 10 is amplified in a series of two carbon dioxide laser amplifiers 11 and 12 and then made incident on the multipath Raman cell 1 with 38 paths where it is converted into light of wavelength about 17 μm, which emerges together with the pump light. At this time, the hydrogen gas is cooled to a temperature of about 240° K. by the circulating brine, and the pressure of the hydrogen gas is about 1,350 Torr. The input-output energy characteristics of the apparatus are shown in FIG. 4. Stokes light begins to be observed at a pump light energy of about 2.7 J/Pulse, and a Stokes light energy of 560 mJ/Pulse is obtained at a pump light energy of 3.7 J/Pulse. If the pump light is increased further, gas breakdown in the medium is likely to occur frequently. Therefore, the pump light energy is limited to 3.7 J/Pulse. It should be noted that when the hydrogen gas temperature was lowered to 300° K. (room temperature) under the same conditions, the existence of Stokes light was not confirmed.

Although the low-temperature Raman laser apparatus of the present invention has been described above by way of an example in which the present invention is applied to a parahydrogen Raman laser apparatus, it should be noted that the present invention is not necessarily limited thereto but may also be applied to other Raman laser apparatuses in which various other gases are used as a Raman conversion medium.

According to the low-temperature Raman laser apparatus of the present invention, a heat absorbing member, through which a brine cooled by a brine refrigerator circulates, is provided around the Raman cell to cool the Raman conversion medium to a temperature in the range of from 200° K. to 300° K. Therefore, there is no need for liquid nitrogen, which has heretofore been consumed at 30 kg/h, for example, under the liquid nitrogen cooling conditions. Accordingly, the running cost consists only of the cost of electric power for cooling the brine. Thus, the running cost can be lowered. In addition, since no liquid nitrogen is used, it becomes unnecessary to conduct an operation of charging liquid nitrogen. Further, constituent elements, e.g., the Raman cell body, mirrors, etc., suffer minimal thermal distortion and hence have substantially the same mechanical stability as that under the room temperature conditions. Therefore, the system running operation is simplified, and the Raman conversion can be stably effected. In the case of a parahydrogen Raman laser apparatus, for example, the plane wave Raman gain coefficient can be increased to about 1.5 times that under the room temperature conditions. Accordingly, the threshold value of pump light power needed to cause saturated Raman conversion can be lowered to about 70% of that in the prior art.

The above description is included to illustrate the preferred embodiments and the operations thereof, and is not intended to limit the scope of the invention. The scope of the invention is to be limited only by the following claims. From the above discussion, many variations are apparent to one skilled in the art which would yet be encompassed by the spirit and scope of the invention.

What we claim is:

1. A low-temperature Raman laser apparatus, comprising:

a Raman cell means, filled with a Raman conversion medium, for converting a wavelength of incident pump light by a Raman conversion action of said Raman conversion medium; and a heat absorbing member means for receiving and circulating therein a brine, said heat absorbing member means being provided around said Raman cell means, wherein said heat absorbing member means includes a refrigerating means for cooling said Raman conversion medium in a variable temperature range of between 200° K. and 300° K., wherein said Raman conversion medium is parahydrogen.

* * * * *